(12) United States Patent
Schafer

(10) Patent No.: US 11,866,225 B2
(45) Date of Patent: Jan. 9, 2024

(54) REUSABLE KNOCK-DOWN SHIPPING CONTAINER

(71) Applicant: FIVES INTRALOGISTICS CORP., Louisville, KY (US)

(72) Inventor: Clyde Schafer, Prospect, KY (US)

(73) Assignee: FIVES INTRALOGISTICS CORP., Louisville, KY (US)

( * ) Notice: Subject to any disclaimer, the term of this patent is extended or adjusted under 35 U.S.C. 154(b) by 42 days.

(21) Appl. No.: 17/684,400

(22) Filed: Mar. 1, 2022

(65) Prior Publication Data

US 2023/0013257 A1 Jan. 19, 2023

Related U.S. Application Data

(60) Provisional application No. 63/155,292, filed on Mar. 1, 2021.

(51) Int. Cl.
*B65D 6/18* (2006.01)
*B65D 33/00* (2006.01)
*B65D 88/52* (2006.01)

(52) U.S. Cl.
CPC .......... *B65D 11/184* (2013.01); *B65D 33/004* (2013.01); *B65D 88/524* (2013.01)

(58) Field of Classification Search
CPC ...... B65D 1/225; B65D 88/52; B65D 21/086; B65D 11/1893; B65D 11/1886; B65D 11/1873; B65D 11/188; B65D 11/1866; B65D 11/186; B65D 11/1853; B65D 11/1846; B65D 11/1833; B65D 11/1826; B65D 11/182; B65D 11/1813; B65D 11/1806; B65D 11/18; B65D 11/184; B65D 33/004; B65D 88/524; B65D 37/00; Y02W 30/80
See application file for complete search history.

(56) References Cited

U.S. PATENT DOCUMENTS

| | | | | |
|---|---|---|---|---|
| 2,016,520 A | * | 10/1935 | Short | A45C 7/0077 190/122 |
| 2,600,501 A | * | 6/1952 | Higgs | A62B 31/00 5/98.1 |
| 2,913,029 A | * | 11/1959 | Paton | B65D 90/046 220/9.3 |
| 3,114,453 A | * | 12/1963 | Rosenthal | B65D 15/22 229/199 |
| 7,106,202 B2 | | 9/2006 | Dickinson | |
| 7,383,953 B2 | | 6/2008 | Dickinson | |
| 8,167,157 B2 | * | 5/2012 | Shalomoff | B65D 15/22 220/9.1 |
| 8,608,050 B2 | | 12/2013 | Seliger | |
| 8,631,956 B2 | | 1/2014 | Dowd | |
| 8,955,704 B2 | * | 2/2015 | Kwon | B65D 7/24 220/9.3 |

(Continued)

*Primary Examiner* — Kareen K Thomas
(74) *Attorney, Agent, or Firm* — CARRITHERS LAW OFFICE, PLLC

(57) ABSTRACT

A shipping container formed from a single piece of flexible planar material as a continuous and contiguous structure foldable into a reusable, knock-down box. The shell body comprises a fabric or mesh and includes a semi-rigid bottom panel and a zipper disposed within an end panel securing an end panel flap. A pair of opposing handles are formed in the end portion and a resealable label pouch is affixed to a top panel.

28 Claims, 3 Drawing Sheets

(56) References Cited

U.S. PATENT DOCUMENTS

| | | | |
|---|---|---|---|
| 8,985,432 B2 * | 3/2015 | Cullen | B65D 5/36 |
| | | | 206/170 |
| 9,637,275 B2 | 5/2017 | Barlas | |
| 9,873,549 B2 | 1/2018 | Heinz | |
| 10,405,621 B2 | 9/2019 | Avila | |
| 10,689,156 B2 | 6/2020 | Sawachi | |
| 10,786,103 B2 | 9/2020 | Teoh | |
| 2008/0203090 A1 | 9/2008 | Dickinson | |
| 2010/0158752 A1 * | 6/2010 | Friderich | A61L 2/26 |
| | | | 422/27 |
| 2011/0168598 A1 * | 7/2011 | Rees | B65D 11/186 |
| | | | 206/505 |
| 2011/0174811 A1 * | 7/2011 | Sabounjian | D06F 95/002 |
| | | | 220/9.2 |
| 2012/0267365 A1 | 10/2012 | Sabounjian | |
| 2013/0087424 A1 * | 4/2013 | Pratt | A45C 13/04 |
| | | | 220/9.2 |
| 2013/0112686 A1 * | 5/2013 | Kwon | B65D 7/28 |
| | | | 220/666 |
| 2014/0117072 A1 * | 5/2014 | Cullen | B65D 5/62 |
| | | | 229/117.05 |
| 2016/0227908 A1 * | 8/2016 | Deioma | A45F 3/04 |
| 2017/0320615 A1 * | 11/2017 | Izquierdo | B65D 5/3635 |
| 2020/0024051 A1 | 1/2020 | Lester | |

* cited by examiner

REUSABLE KNOCK-DOWN SHIPPING CONTAINER

REFERENCES TO RELATED APPLICATIONS

This application claims priority from U.S. Provisional Application Ser. No. 63/144,292 filed on Mar. 1, 2021 which is incorporated by reference in its entirety.

TECHNICAL FIELD

The present invention relates to the field collapsible and reusable shipping containers.

BACKGROUND OF THE INVENTION

Shipping containers are typically boxes, crates, or bags filled with small and large parcels as well as letters, pouches and elongated products such as tubes. A container may be filled with articles all constituting the same product or a mixture of products.

General merchandise shipping boxes are typically composed of polymer resin crates usually as sealed boxes or other configurations or a corrugated fiber board or "cardboard" box which often are collapsed and erected for use. Flaps form the top and bottom, folded and taped to seal the bottom of the box. The top flaps may be connected to one another with tape, velcro, ties, string, or fastening members such as staples.

Plastic containers or crates need to be scrubbed periodically with high-pressure and high-temperature fluids, such as water, soap, and the like. They tend to be more expensive than cardboard corrugated boxes, and when damaged must often be destroyed. Moreover, sanitizing plastic containers can be expensive and time consuming.

Erected fiberboard, cardboard, or plastic corrugated boxes usually have a bottom that has been folded and taped in order to support the box erected from a flattened condition to a rectangular box shape. The top flaps fold outward and down around the box, or leave the flaps are left in the position extended open position presenting impediments to users filling such boxes. The top flaps tend to form obstacles. Flaps connecting to one another standing vertically force the user to bend over to reach down into the box to place anything on the bottom of the box, or flaps extending away from the box walls form a horizontal stand off pushing the user away from the interior of the box Flaps typically tend to fold inward, and when closed angle inward obstructing access to the interior of the box. Thus, each item placed must require of the user to either hold the flaps out of the way, or to reach in and pull the flaps back in order to add each respective item. Complete removal of the flaps or elimination of the flaps obstruct a user's access to the box is desirable.

Cardboard type boxes are less expensive and often disposable and cut down, baled into bales, and returned to a paper manufacturing company for recycling. The plastic tape used to seal the boxes must be removed from the recycled fibers. Boxes secured with staples and other fasteners, glues, present recycling issues. Moreover reuse of boxes is complicated because the volume of boxes is typically disproportionate to the items contained therein and they are large compared to their weight. Stripping off tape, tearing out staples, destroys the box so that reuse is impractical.

Large zipper bags are used by the US Mail Service, UPS, Federal Express, banks, federal reserve, the armed forces, industries, and other commercial groups for transportation and storage of mail and other parcels and goods throughout the world. These bags are large and heavy and require heavy zippers as a closure. Moreover, the bags are rectangular and pillow shaped or cylindrical making handling, transporting, and storage of the bags difficult.

The shipping container of the present invention comprises a fabric or woven material shipped to a user location in a knocked-down configuration and erected to form a box. The fabric/mesh container is a continuous and contiguous structure foldable into a reusable, knock-down box completely connected and sealed at all locations except the lid closure. The fabric container can be easily erected to an assembled condition with a minimum of effort and movement without the use of tools. Furthermore, the present invention does not require removal of tape, glue, staples, or any disposable fasteners in order to return the container to its original knocked-down configuration.

SUMMARY OF THE INVENTION

The present invention comprises or consists of collapsible reusable shipping container formed from a single piece of fabric, cloth, or woven planar material such as polypropylene mesh material as a continuous and contiguous structure, foldable into a re-usable, knock-down box. The container includes a bottom base panel 3 mm thick and composed of ABS or urethane to support contents placeable in the box, front and rear panels operating as shear walls to support the bottom and end panels adjacent to and extending between the front panel, rear panel, side panels, and bottom panel. The front panel includes a hinged flap which attached to top and side edges of the front panel by a zipper. A resealable label pouch is affixed to the top surface of the top panel.

The single piece of mesh or textile material includes a scored or creased region extending along the longitudinal edges of the panels allowing folding of the panels between a flat position and erected position whereby the panels are disposed at 90 degree angles from one another forming a box.

The side panels include a medial longitudinal crease or score line or seam on the outer surface of each side panel permitting the panels to fold inwardly when the box is collapsed to a flat state. The front and rear panels may be scored from its bottom corner closest to the end panel upward to its opposite diagonal corner. The diagonal score line performs as a hinge line permitting the front end panel and rear end panel to fold down toward the bottom of the box, while the hinge panel bends along its center diagonal to form two adjacent hinged triangles. When the ends are pulled apart or lifted apart, the hinge panels draw the front and back panels of the box together, and upright to the erect or assembled configuration.

More particularly, the present invention comprises of consist of a reusable collapsible shipping container utilizing a single piece of flexible continuous and contiguous planar material comprising a textile fabric or mesh of natural man made or synthetic fibers such as polypropylene to form a mesh shell. The planar material is formed having a plurality of longitudinal creases or seams forming a spaced apart top panel opposing a bottom panel, and a pair of opposing side panels connecting the top panel and the bottom panel. A rear panel has edges attaching to the edges of the top panel, the bottom panel, and the opposing side panels. A front panel has edges attaching to the edges of the top panel, the bottom panel, and the opposing side panels. The front panel includes a hinged flap having a bottom hinge and a top edge and side edges attaching to the front panel by a zipper. The front panel and the rear panel includes a centrally disposed opening from handles. A resealable label pouch affixed to a top surface of the top panel. Each one of the side panels include a medial longitudinal cease or seam extending a selected distance from a center position and diagonal creases or seams extending from the distal ends of the medial longitudinal ceases to each upper and lower corner of the container. A semi-rigid removable bottom or base is composed of ABS plastic or urethane at a selected thickness, for example, three millimeters.

The container may be maintained in the sealed condition with no tape, sealers, staples or the like. Alternately, for security, any edges may be sealed. Nevertheless, the box need not sustain any damage other than a certain amount of wear if no fasteners are used.

Other objects, features, and advantages of the invention will be apparent with the following detailed description taken in conjunction with the accompanying drawings.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
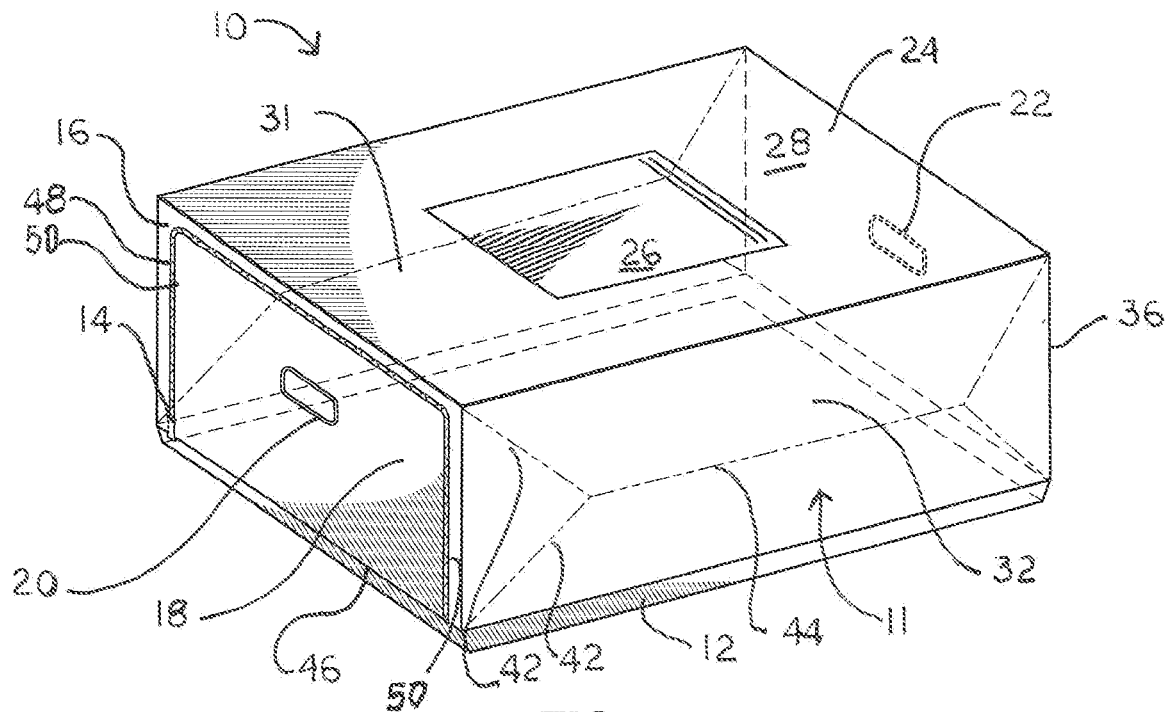
FIG. 1 is an oblique view of the reusable knock-down shipping container including broken lines to indicate ceases or fold lines.
Figure 2:
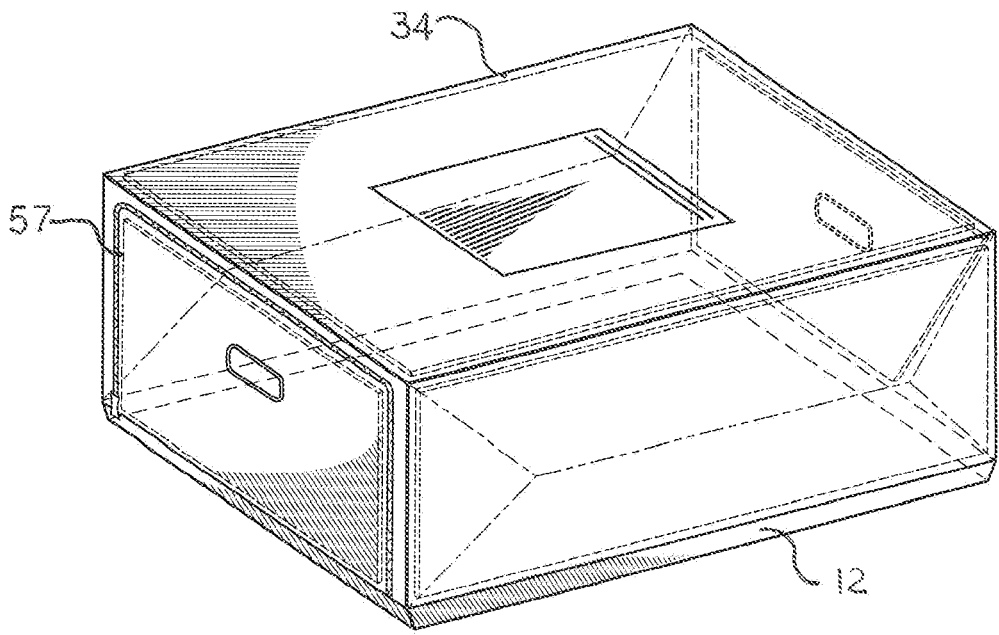
FIG. 2 shows a plurality of flat sheets which can be selected and removably inserted to provide panels for stiffening the bag including a front panel, end panel, side panels, top panel and bottom panel.

A shipping container formed from a single piece of flexible planar material as a continuous and contiguous structure foldable into a reusable, knock-down box has a shell body comprising a fabric or mesh material with seams and includes a semi-rigid bottom panel and a zipper disposed within an end panel securing an end panel flap. A pair of opposing handles are formed in the end portion and a resealable label pouch is affixed to a top panel.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "parcel" includes articles, envelopes, mail, packages, bags, drums, boxes, or irregular shaped items or conveyed containers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in the FIGS. 1-5, the present invention relates to a shipping container 10 formed from a single piece of flexible planar material as a continuous and contiguous structure foldable into a reusable, knock-down box. The shell body comprises a fabric or mesh and includes a semi-rigid bottom panel 12 and a zipper 14 disposed within an front end panel 16 securing an end panel flap 18. A handle opening 20 is formed in the front end panel 16 and a handle opening 22 is formed in the rear end panel 24. A resealable label pouch 26 is affixed to a top panel 28.

The reusable knock-down shipping container of the present invention includes a collapsible fabric or mesh shell body portion 11 with a removable and replaceable panel inserts 30 for the top panel 26, bottom panel 12, side wall panels 31, 32, rear end panel 24 and front end panel 16 composed of semi-rigid bottom panel composed of a stiff material such as acrylonitrile butyl styrene "ABS", urethane, corrugated polyvinyl chloride "PVC", polyethylene, corrugated paper or cardboard, polystyrene foam, canvas, ribbed plastic sheet, or fibrous material, and/or multi-ply paper composite. It is contemplated that no panel insert 30 would be required; however, one or more panels inserts 30 could be inserted as flat sheets to improve the structural integrity of the bag or aid in retaining the shape of the bag when filled with heavy loads or irregular shaped items in order to provide an stackable storage and transport means.

The container is configured with seams 34 for having first and second opposing planar panel portions "panels" defining an upper or first top panel and a second bottom panel. A third side portion "panel" and opposing fourth side portion "panel" connect the first top panel to the second bottom panel by living hinges 36 formed from a longitudinal crease, longitudinal score line, or a longitudinal crease forming a hinge seam 34 which expands from 0 degrees in a flat collapsed state to 90 degrees in an erected state forming right angles therebetween. The first top panel and second bottom panel, and the third side panel and fourth side panel are of a selected equal length and width. A first longitudinal crease is formed between the first top panel and third side panel; a second longitudinal crease is formed between the first top panel and fourth side panel; a third longitudinal crease is formed between the third side panel and second bottom panel; a fourth longitudinal crease is formed between the fourth side panel and second bottom panel. The creases may be sharp or rounded depending upon the thickness of material and capacity of the container.

It is anticipated that creases may be formed in a flexible sock or tube by sewing, adhering, molding, weaving or forming synthetic material around an object shaping same.

A planar fifth rear panel 24 is formed as a continuous or contiguous portion connecting to the main body by a joining of material by sewing, welding, adhesion or other means of attachment. The planar fifth rear panel is formed by a crease or seam extending around the peripheral edges of the fifth panel. A crease or seam forms an first rear top edge between the first top panel and the fifth rear panel; a crease or seam forms a second rear side edge between the third side panel and the firth rear panel; a crease or seam forms a third rear bottom edge between the second bottom panel and the firth rear panel, and a crease or seam forms a fourth rear side edge between the fourth side panel and the fifth rear panel. An opening 22 is formed in the center area of the rear panel forming a handle for lifting the container.

A planar sixth front panel 16 is formed as a continuous or contiguous portion connecting to the main body by a joining of material by sewing, welding, adhesion or other means of attachment. The planar sixth front panel is formed by a crease or seam extending around the peripheral edges of the sixth front panel. A crease or seam forms a first front edge between the first top panel and the sixth front panel; a crease or seam forms a second front side edge between the third side panel and the sixth front panel; a crease or seam forms a third front edge between the second bottom panel and the sixth front panel, and a crease of seam forms a fourth front side edge between the fourth side edge and the sixth front panel. An opening 40 is formed in the center area of the rear panel forming a handle for lifting the container.

The third side panel and the fourth side panel include longitudinal medial creases 42 or score lines on the outer surface extending a selected distance from the center of the panels toward each end, whereby the creases extend diagonally from the medial to the upper and lower corners of the intersection of the side panels with the first top panel and second bottom panel. The medial creases 42 and diagonal creases 44 formed in the side panels allow the panels to fold inward when the container is collapsed flat for storage or transport and expand outward when the container is erected into a box configuration.

The front end panel 16 includes a a zipped panel 18. The zipper 14 extends from the bottom side of the front end lower portion upward along the side portion to a position adjacent the upper portion extending over to the opposing side of the upper portion and down to the lower portion forming a panel having a hinge 46 extending above the lower portion of the front end portion. The zipper includes a mail track 48 and a female track 50 that can be joined together. The mail track and the female track can be formed by injection molding. The mail track and the female track may comprise a main part and a distal end provided on opposite ends of the main part, the height of each of the distal ends being lower than the main part.

Figure 3:
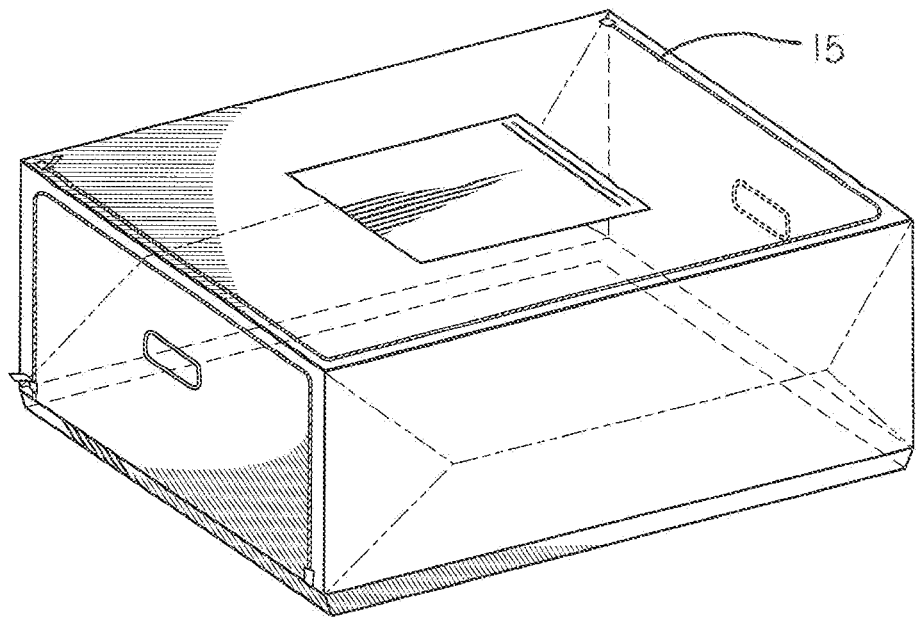
FIG. 3 shows an embodiment including a top panel which is secured by a heavy zipper and can be used alone or in combination with the end zipper.
Figure 4:
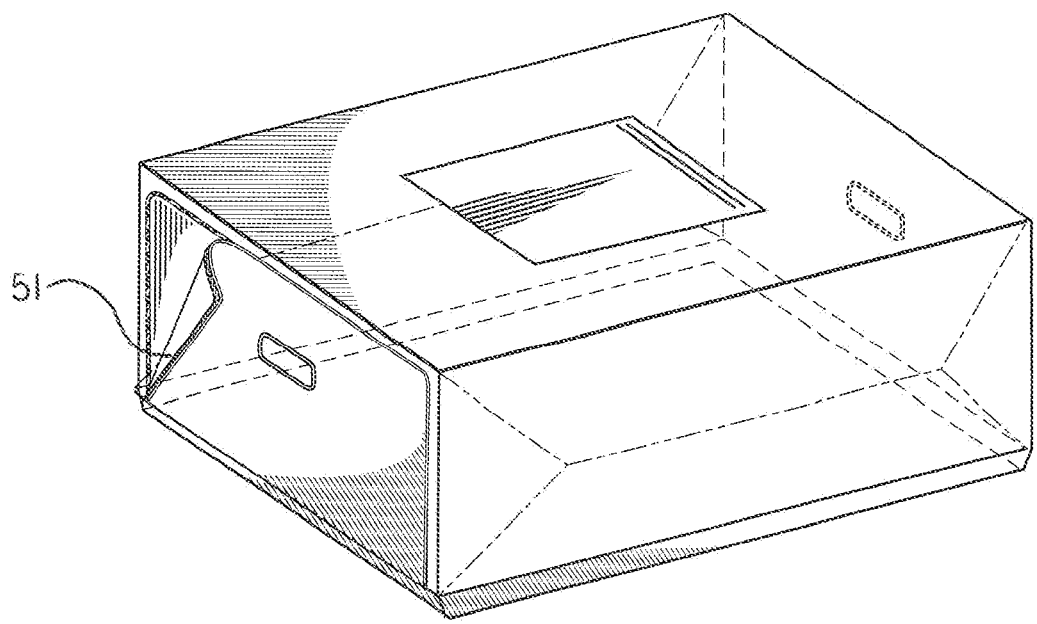
FIG. 4 shows the front panel opening secured by a hook and loop fastener strip "VELCRO"

It is contemplated that a hook and loop fastener such as a VELCRO strip 51 could be utilized in place or in combination with the zipper 14 as shown in FIG. 4 to secure an opening in the top, sides, or ends as shown in FIG. 3 as a top zipper 15. Moreover, a strip of hook or loop fasteners may be attached to selected points on the interior of the bag to cooperatively engage hook or loop fasteners attached to the rigid panels by an adhesive or other means of fastening to hold the removable insertable panels 30 in position for insertion of articles therein.

Figure 5:
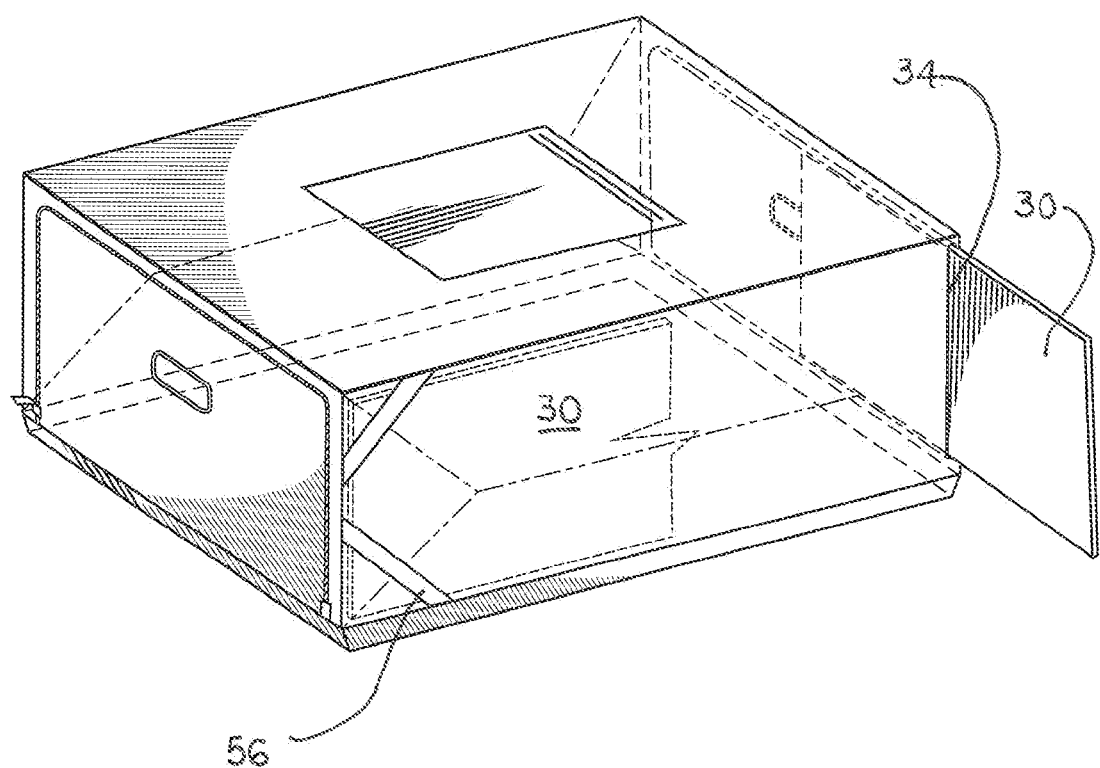
FIG. 5 shows a double ply surface for removable insertion of rigid panels between the layers and also shows strips of material forming diagonal straps in the interior of the erected bag in the corners for removably supporting rigid panels.

Moreover, the body of the bag could include a double ply wall including slits 54 for insertion of rigid panels 30, or strips of material 56 attached to selected points on the interior of the bag to insert the corners of the rigid panels therein for temporary support as shown in FIG. 5.

The container body portion may have a seal, such as for instance a pair of opposing narrow flaps or tabs 57, disposed outside the zipper and having an opening guide, the opening guide being provided in parallel with the zipper such that the seal is easily cracked and opened along the opening guide. It is contemplated that a slide zipper cooperatively engaging tongue and groove members or hook and loop fasteners may be used as well.

An opening or cutout in the front and rear end panels provide a pair of opposing handles formed in the end portion. The edge of the openings may include reinforcement material and/or additional stitching for structural support.

A resealable label pouch 59 is affixed to a top panel 28.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A reusable collapsible shipping container, comprising:
   a single piece of flexible continuous and contiguous planar material comprising a textile fabric or mesh of natural man made or synthetic fibers;
   said planar material formed having a plurality of longitudinal creases or seams forming a spaced apart top panel opposing a bottom panel, and a pair of opposing side panels connecting said top panel and said bottom panel;
   a rear panel having edges attaching to said edges of said top panel, said bottom panel, and said opposing side panels;
   a front panel having edges attaching to said edges of said top panel, said bottom panel, and said opposing side panels;
   said front panel including a hinged flap having a bottom hinge and a top edge and side edges attaching to said front panel by a zipper;
   said front panel and said rear panel including a centrally disposed opening forming handles;
   a resealable label pouch affixed to a top surface of said top panel;
   said side panels including medial longitudinal ceases or seams extending a selected distance from a center position and diagonal creases or seams extending from a distal end of said medial longitudinal cease to each upper and lower corner of said container; and
   a semi-rigid removable bottom or base is composed of ABS plastic or urethane.

2. A reusable collapsible shipping container, comprising:
   a single piece of flexible continuous and contiguous planar material comprising a textile fabric or mesh of natural man made or synthetic fibers;
   said planar material formed having a plurality of longitudinal creases or seams forming a spaced apart top panel opposing a bottom panel, and a pair of opposing side panels connecting said top panel and said bottom panel;
   a rear panel having edges attaching to said edges of said top panel, said bottom panel, and said opposing side panels;
   a front panel having edges attaching to said edges of said top panel, said bottom panel, and said opposing side panels;
   said front panel including a hinged flap having a bottom hinge and a top edge and side edges attaching to said front panel by a zipper;
   said front panel and said rear panel including a centrally disposed opening forming handles;
   said side panels including medial longitudinal ceases or seams extending a selected distance from a center position and diagonal creases or seams extending from a distal end of said medial longitudinal ceases to each upper and lower corner of said container; and
   a semi-rigid removable bottom or base.

3. The reusable collapsible shipping container of claim 2, wherein said semi-rigid removable bottom or said base is composed of ABS plastic or urethane.

4. The reusable collapsible shipping container of claim 2, including a resealable label pouch affixed to a top surface of said top panel.

5. The reusable collapsible shipping container of claim 2, wherein said single piece of flexible continuous and contiguous planar material comprises a polypropylene mesh material.

6. The reusable collapsible shipping container of claim 2, said planar material formed having a plurality of longitudinal creases or seams forming a top panel opposing a bottom panel, and a pair of opposing side panels connecting said top panel and said bottom panel connecting said front panel and said opposing rear panel allowing folding and unfolding of said top panel, said bottom panel, said pair of opposing side panels, said front panel and said rear panel between a flat position and erected position whereby said top panel, said bottom panel, said pair of opposing side panels, said front panel and said rear panel are disposed at 90 degree angle from one another forming a foldable, reusable, knock-down box.

7. The reusable collapsible shipping container of claim 2, wherein said semi-rigid removable bottom or said base is 3 mm thick.

8. The reusable collapsible shipping container of claim 2, wherein said semi-rigid removable bottom or said base comprises an ABS or urethane material.

9. The reusable collapsible shipping container of claim 8, wherein said semi-rigid removable bottom or said base is 3 mm thick.

10. The reusable collapsible shipping container of claim 2, including a top panel secured by a zipper.

11. The reusable collapsible shipping container of claim 2, including a top panel secured by a hook and loop fastener.

12. The reusable collapsible shipping container of claim 2, wherein said front panel, said rear panel, said pair of opposing side panels, said bottom panel, or said top panel comprises a double ply surface comprising a first layer and a second layer for removable insertion of a rigid strip of material between said first layer and said second layer.

13. The reusable collapsible shipping container of claim 2, wherein said front panel, said rear panel, said pair of opposing side panels, said bottom panel, or said top panel includes a diagonal strap disposed in a corner of an interior of an erected container for removably supporting a rigid panel.

14. A reusable collapsible shipping container, comprising:
    a single piece of flexible continuous and contiguous planar material comprising a textile fabric or mesh of natural man made or synthetic fibers;
    said planar material formed having a plurality of longitudinal creases or seams forming a spaced apart top panel opposing a bottom panel, and a pair of opposing side panels connecting said top panel and said bottom panel;
    a rear panel having edges attaching to said edges of said top panel, said bottom panel, and said opposing side panels;
    a front panel having edges attaching to said edges of said top panel, said bottom panel, and said opposing side panels;
    said front panel, said top panel, or a combination thereof including a hinged flap attaching to said front panel or said top panel by means of fastening;
    said front panel and said rear panel including a centrally disposed opening forming handles;
    said side panels including medial longitudinal ceases or seams extending a selected distance from a center position and diagonal creases or seams extending from a distal end of said medial longitudinal cease to each upper and lower corner of said container; and
    a semi-rigid removable bottom or base.

15. The reusable collapsible shipping container of claim 14, wherein said semi-rigid removable bottom or said base is composed of ABS plastic or urethane.

16. The reusable collapsible shipping container of claim 14, including a resealable label pouch affixed to a top surface of said top panel.

17. The reusable collapsible shipping container of claim 14, wherein said single piece of flexible continuous and contiguous planar material comprises a polypropylene mesh material.

18. The reusable collapsible shipping container of claim 14, said planar material formed having a plurality of longitudinal creases or seams forming a top panel opposing a bottom panel, and a pair of opposing side panels connecting said top panel and said bottom panel connecting said front panel and said opposing rear panel allowing folding of said top panel, said bottom panel, said pair of opposing side panels, said front panel and said rear panel between a flat position and erected position whereby said top panel, said bottom panel, said pair of opposing side panels, said front panel and said rear panel are disposed at 90 degree angle from one another forming a foldable, reusable, knock-down box.

19. The reusable collapsible shipping container of claim 14, wherein said semi-rigid removable bottom or said base is 3 mm thick.

20. The reusable collapsible shipping container of claim 14, wherein said semi-rigid removable bottom or said base comprises an ABS or urethane material.

21. The reusable collapsible shipping container of claim 20, wherein said semi-rigid removable bottom or said base is 3 mm thick.

22. The reusable collapsible shipping container of claim 14, wherein said means of fastening said top panel is a zipper.

23. The reusable collapsible shipping container of claim 14, wherein said means of fastening said top panel is a hook and loop fastener.

24. The reusable collapsible shipping container of claim 14, wherein said means of fastening said front panel is a hook and loop fastener.

25. The reusable collapsible shipping container of claim 14, wherein said means of fastening said front panel is a zipper.

26. The reusable collapsible shipping container of claim 14, wherein said front panel, said rear panel, said pair of opposing side panels, said bottom panel, or said top panel comprise a double ply surface comprising a first layer and a second layer.

27. The reusable collapsible shipping container of claim 26, wherein said front panel, said rear panel, said pair of opposing side panels, said bottom panel, or said top panel comprise a double ply surface comprising a first layer and a second layer having a slit for removable insertion of a rigid strip of material between said first layer and said second layer.

28. The reusable collapsible shipping container of claim 14, wherein said front panel, said rear panel, said pair of opposing side panels, said bottom panel, or said top panel includes a diagonal strap disposed in a corner of an interior of an erected container for removably supporting a rigid panel.

* * * * *